United States Patent [19]
Sanchez

[11] Patent Number: 4,653,161
[45] Date of Patent: Mar. 31, 1987

[54] MANUFACTURE PROCESS FOR ALUMINUM ALLOY DIE-CAST CYLINDERS

[75] Inventor: Don Casimiro L. Sanchez, Barcelona, Spain

[73] Assignee: Industrias Mediterraneo, S.A., Barcelona, Spain

[21] Appl. No.: 804,453

[22] Filed: Dec. 4, 1985

[30] Foreign Application Priority Data

Dec. 5, 1984 [ES] Spain .................................... 538.913

[51] Int. Cl.[4] .............................................. B23P 11/02
[52] U.S. Cl. ................................. 29/156.4 R; 29/428; 29/527.6; 29/DIG. 4
[58] Field of Search ............... 29/156.4 R, 156.4 WL, 29/428, 527.5, 527.6, DIG. 4, DIG. 2; 228/127

[56] References Cited

U.S. PATENT DOCUMENTS

| | | | |
|---|---|---|---|
| 2,001,854 | 5/1935 | Shoemaker et al. | 29/156.4 R X |
| 2,125,106 | 7/1938 | Gehret | 29/156.4 WL X |
| 2,144,928 | 1/1939 | Moncrieff | 29/156.4 WL |
| 2,283,959 | 5/1942 | Vincent | 29/156.4 R X |
| 2,301,235 | 11/1942 | Willgoos | 29/156.4 WL X |

FOREIGN PATENT DOCUMENTS

| | | | |
|---|---|---|---|
| 289483 | 11/1928 | United Kingdom | 29/156.4 R |

*Primary Examiner*—Nicholas P. Godici
*Assistant Examiner*—J. Reed Batten, Jr.
*Attorney, Agent, or Firm*—Holman & Stern

[57] ABSTRACT

An aluminum cylinder for a two-stroke engine is die cast in two separate parts which are subsequently press-fitted together by differential heating. The parts are joined along a line which intersects the cylinder's inlet and exhaust ports. Thus, the port sections on the respective parts can be readily machined before the parts are fitted together.

2 Claims, 2 Drawing Figures

MANUFACTURE PROCESS FOR ALUMINUM ALLOY DIE-CAST CYLINDERS

Figure 1:
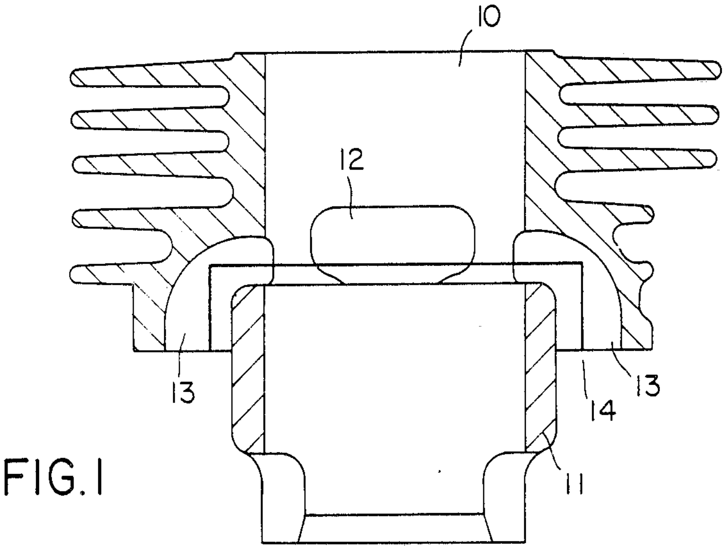

This application relates to the manufacture of an aluminum cylinder for a two stroke engine.

At the present time, the cylinders of 2-stroke engines, particularly for mopeds, are made from aluminium for considerations both of price and of low weight and fuel consumption. The price of fuel is important in view of the price difference between Europe and America, the price in the former being two to three times higher than in the latter.

To overcome the abovementioned price differences, it is necessary to attain a high performance with a low fuel consumption, for which purpose a very fine surface finish of the inlet and exhaust passages and very particularly of the scavenging charge passages, as well as a high thermal conductivity from the inner face of the cylinder to the fins or to the cooling water is very important. Further to these thermal aspects, the production cost must be as low as possible.

The dimensions of the inlet, scavenging and exhaust ports, as well as the distances between them, have a direct effect both on the performance and on the fuel consumption; also to obtain an effective scavenging and low fuel consumption, a broad radius starting from the lower edge of the charge passage is required.

To the above passage design considerations there should be added those derived from the thermal conductivity of the cylinder wall. So that two-stroke engines may operate effectively, a speedy evacuation of the heat from the innermost surface of the cylinder to the outermost surfaces of the cooling fins is required. If the above conductivity is low, the unit overheats with danger of seizing of the first ring and erosions on the rings and on the first piston, whereby the engine performance will diminish. The iron sleeve usually used in two-stroke engines for the above reasons hinders the dissipation of heat from the interior of the cylinder to the fins.

Laboratory tests have shown that a cylinder with aluminium walls is the most favourable solution when the inner face of the cylinder is covered with a 50 micron chromium layer or a 150 micron iron layer, whereby a reduction in the heat evacuation of 98 to 99% is achieved.

There are on the market other processes for coating the inner surfaces of cylinders, but in all of them the thermal conductivity values obtained are lower than those obtained with an aluminium wall having the inner surface of the cylinder chromium plated or nickel plated.

In a word, for the performance, specific fuel consumption, cylinder temperature and weight, a low pressure cast aluminium cylinder, with the inner surface nickel or chromium plated, is the best, followed closely by a die-cast cylinder, having a better or equal performance, once the moulding system for the passages has been achieved.

Nevertheless, although the heat considerations are important, also important are the problems of machining the inlet and exhaust passages which both if the cylinder has been case or die-cast is hard to resolve since the unit is an integral piece.

All the above explained and justified drawbacks are overcome with the object of the present invention which comprises a total change in the way of making the cylinder.

The process claimed comprises the manufacture of the cylinder in two parts, the upper compression area and the lower piston guiding area divided by the stripping line of ports, charge and exhaust, the two halves being made of die-cast aluminium, followed by turning of the housing in the upper portion (female) and the lower portion (male) followed by assembly of the two parts with maximum interference when hot (zone "a") or cold (zone "b"), whereby a cylinder of the same conditions as the one moulded in shell or at low pressure is obtained. This is then followed by the machining process, hard chromium plating and inner finish with maximum precision and a surface quality of optimum fineness.

Further details and features of this invention will be disclosed in the description given hereinafter, where in reference is made to the drawings accompanying this specification in which, schematically, the preferred details are shown. These details are given as an example, with reference to one possible practical embodiment, but it is not limited to the details given here; therefore this description should be considered from an illustrative point of view without any type of limitations.

FIG. No. 1 is an elevation view of the cross-section of a cylinder wherein the two parts comprising the cylinder with symmetrical ports are shown with a heavy line.

FIG. No. 2 is an elevation view of the cross section of a cylinder in which the heavy line shows the two parts comprising the cylinder, with asymmetrical ports.

Figure 2:
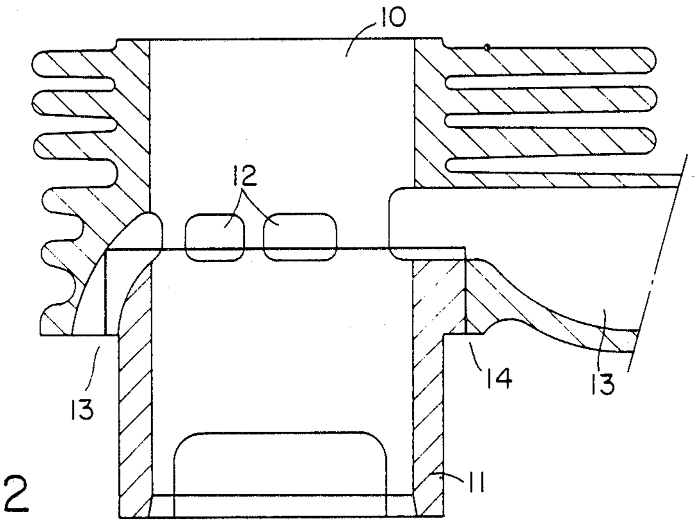

The manufacturing process is started with the injection of the molten aluminium separately in the respective dies for the upper cylinder part (10) and the lower part (11). Thereafter, after the injection operation is completed and before joining (10) and (11), both are turned along a mould stripping line (14), namely the line of junction of the two parts, which is shown in the FIGS. 1 and 2 with a heavy line and which, as shown, intersects the respective ports.

To join (10) and (11), the upper portion of the cylinder (10) is heated by any process to achieve expansion of (10) and thereafter, by mere pressure, (10) and (11) are coupled thus forming a single unit on cooling down.

Prior to joining (10) and (11) by heat, any finishing or grinding operations which are required may be carried out with complete freedom of movements for any type of tool or machine, which operations would be difficult to perform if the cylinder had been manufactured in an integral piece and in any case with low precision. The configuration of the inlet ports (13) with their curved form may be easily machined like the exhaust ports (12) thanks to this new process since access thereto is direct, which does not happen with the traditional processes.

FIG. No. 2 shows a cylinder manufactured by the same process as that of FIG. No. 1 but with a different fully asymmetrical port configuration. Obviously in this second case the advantages of the process are appreciated even more, since from the mould stripping line (14) it is possible to finish any inner surface of the parts (10) and (11) with maximum ease.

Finally, after (10) and (11) have been attached together, the cylinder is chromium plated and the interior is finished with maximum precision and a surface finish of maximum fineness. With this process optimum yields and low production costs are achieved. The cost savings may be set at around 40% relative to hard chromium plated aluminium cylinders moulded in shell or at low pressure.

Having described sufficiently the content of this application in correspondence with the attached drawings, it will be understood that any modification of details being to be desirable may be made provided that it does not alter the essence of the invention which is summarised in the following claims.

I claim:

1. A method of manufacturing an aluminum cylinder for a two stroke engine, the cylinder having inlet and exhaust ports, the method comprising separately die casting a female head portion of the cylinder and an interfitting male skirt portion of the cylinder, providing mutually complementary sections of the respective ports at interfitting edges of the respective portions, and press-fitting the respective portions together by differential heating with the respective sections of the ports in mutual engagement whereby the portions are joined together along a junction line intersecting the respective ports.

2. The method as defined in claim 1 including the step of separately machining the sections of the respective ports prior to press-fitting the portions together.

* * * * *